US006934284B1

(12) United States Patent
Danielson et al.

(10) Patent No.: US 6,934,284 B1
(45) Date of Patent: Aug. 23, 2005

(54) METHODS FOR ESTABLISHING CONTROL SIGNALING AT LINK START-UP

(75) Inventors: Magnus Danielson, Stocksund (SE); Christer Bohm, Nacka (SE); Björn Fahller, Årsta (SE); Anders Boström, Solna (SE); Martin Christiansson, Årsta (SE); Erik Brage, Stockholm (SE)

(73) Assignee: Net Insight AB, Hagersten (SE)

( * ) Notice: Subject to any disclaimer, the term of this patent is extended or adjusted under 35 U.S.C. 154(b) by 0 days.

(21) Appl. No.: 09/539,468

(22) Filed: Mar. 30, 2000

(51) Int. Cl.$^7$ .............................................. H04Q 11/04
(52) U.S. Cl. ...................................... 370/384; 370/458
(58) Field of Search ................................ 370/360, 384, 370/400, 442, 443, 458–462, 465, 468

(56) References Cited

U.S. PATENT DOCUMENTS

| 5,982,747 | A | * | 11/1999 | Ramfelt et al. ............. 370/224 |
| 6,504,853 | B1 | * | 1/2003 | Lindgren et al. ........... 370/468 |
| 2002/0126688 | A1 | * | 9/2002 | Lindgren et al. ........... 370/442 |

FOREIGN PATENT DOCUMENTS

| WO | WO 97/36400 | 10/1997 |
| WO | WO 97/36401 | 10/1997 |
| WO | WO 97/36402 | 10/1997 |

OTHER PUBLICATIONS

Bohm et al, "The DTM Gigabit Network," Jun. 1993.*

* cited by examiner

Primary Examiner—Hassan Kizou
Assistant Examiner—D Levitan
(74) Attorney, Agent, or Firm—MacPherson Kwok Chen & Heid LLP

(57) ABSTRACT

The present invention refers to methods for establishing control signaling between nodes connected to the same communication link, said link carrying a bitstream that is divided into frames, each frame in turn being divided into time slots, said time slot being allocatable to define circuit switched channels.

According to the invention, all nodes connected to said link using, at link start-up, the same predefined time slot or set of time slots in said frames to receive control signaling messages from and transmit control signaling messages to nodes connected to said link. The nodes then establishes, using control signaling via said predefined time slot or set of time slots, respective control channels, defined by respective time slot or set of time slots in said frames, reserved for transmission of control signaling messages from each respective one of said nodes. Based thereupon, each respective one of said nodes uses, when having been established such a respective control channel, said control channel to transmit control signaling messages to other nodes connected to said link, the other nodes accessing this control channel only for receiving control signaling messages.

22 Claims, 3 Drawing Sheets

METHODS FOR ESTABLISHING CONTROL SIGNALING AT LINK START-UP

TECHNICAL FIELD OF THE INVENTION

The present invention refers the field of data and telecommunications, and more specifically to methods for establishing control signaling between nodes connected to the same communication link, said link carrying a bitstream that is divided into frames, each frame in turn being divided into time slots, said time slots being allocatable to define circuit switched channels.

BACKGROUND OF THE INVENTION

In certain time division multiplexed networks using recurring frames that are divided into time slots that are allocatable to define circuit switched channels, the time slots are used in such a way that control signaling, i.e. signaling among the nodes of the network with the purpose of controlling the operation of the network as such, is preformed in channels (time slots) that are completely separated from the channels (time slots) that carries the actual user (payload) traffic.

An example of such a network is the Dynamic synchronous Transfer Mode (DTM) network, wherein control signaling messages are transferred using so-called control channels which are separate from the so-called data channels that are used for the transfer of actual user (payload) traffic. All advantage of the DTM network is that the size of the channels, both the control channels and the data channels, may be adjusted as desired by simply increasing or decreasing the number of time slots allocated to (reserved for) the respective channel, as has been described in, for example, the International Patent Application SE97/00521.

However, a disadvantage with this prior an is that, in order for the nodes to be able to start communicating with each other to, for example, set up payload traffic channels, each node on a link typically has to know, for each other node on that link, which time slots in the recurring frame on that link that other node uses as its control channel. This means that either the time slot location of such channels must be in some way be predefined or the operator must manually, or by use of an overlying management system, configure the channels as found fit on the subject link at link set-up, thereby either limiting network configuration freedom or adding undesired configuration steps during link set-up.

SUMMARY OF THE INVENTION

In view of the above, an object of the invention is to provide a solution that lessens the amount of pre-configuration needed Lo get automatic channel establishment operations up-and-going at network start-up.

This, according to an aspect of the invention, all nodes connected to the same link is preconfigured to use, at link start-up, the same predefined time slot or set of time slots in said frames to receive control signaling messages from and transmit control signaling messages to nodes connected to the link. The nodes then establishes, using control signaling via said predefined time slot or set of time slots, respective control channels, defined by respective time slots or sets of time slots in said frames, reserved for transmission of control signaling messages from respective ones of said nodes. Each respective one of the nodes then uses its respective control channel to transmit control signaling messages to other nodes connected to the link, the other nodes accessing said this dedicated control channel only for receiving control signaling messages.

An advantage of tho invention is thus that all nodes on a link can, immediately at link start-up, start communicating with each other on the link using a well know, shared time slot or set of time slots, and may thus use this shared signaling slot (or set of slots) for any kind of control signaling, for example to manage any type of channels, especially including setting up respective control channels, each dedicated for use by a respective node. Thus, the invention provides, as compared to prior art, a simplified scheme for configuring a link at linkstart up, requiring less operator interaction without imposing undesirable requirements on the use of predefined configurations. Futhermore, another advantage is that the same protocol that is used on the control channels for establishing payload channels may be used on said predefined time slot or set of time slots for establishing control channels (and payload channels). Thus, there is no need for providing one mechanism for establishing control channels and another mechanism for establishing payload channels.

According to a preferred embodiment of the invention, each respective node will, when it has been reserved a respective control channel defined by a respective time slot or set of time slots, use said control channel to transmit certain types of control signaling messages, such as messages referring to actual channel management, and will at the same time continue using said predefined time slot or set of time slots to transmit other types of control signaling messages, such as messages referring to link state monitoring.

This embodiment has the advantage of, for example, providing the possibility of using the predefined node-to-neighbor-node signaling path, i.e. the predefined time slot or set of time slots, for signaling protocols that to a high degree rely on node-to-neighbor-node signaling or message forwarding, such as some types of synchronization or link topology discovery/monitoring protocols, while at the same time using the dedicated control channels for other control signaling not relying to the same high degree on node-to-neighbor-node signaling, such as channel management signaling.

The above mentioned and other features, embodiments and aspects of the invention will be further exemplified below with reference to the accompanying drawing.

BRIEF DESCRIPTION OF THE DRAWINGS

An exemplifying embodiment of the invention will now be described with reference to the accompanying drawings, wherein.

DETAILED DESCRIPTION OF THE PREFERRED EMBODIMENT

Figure 1:
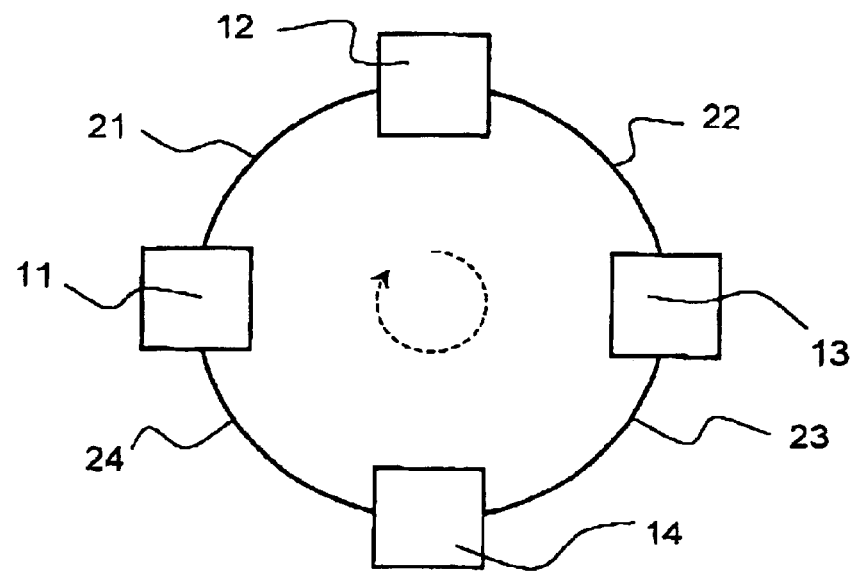
FIGS. 1, 4, and 6 schematically show a network of nodes implementing an embodiment of the invention.

A network of nodes implementing an embodiment of the invention is schematically shown in FIG. 1. The exemplifying network comprises four nodes 11–14 interconnected via four optical fibers 21–24 together forming a unidirectional single ring link. A bitstream circulating on the single ring link (in the direction illustrated by the semi-circular dashed arrow in the center of FIG. 1, is carried by the fiber 21 from node 11 to node 12, by the fiber 22 from node 12 to node 13, by the fiber 23 from node 13 to node 14, and by the fiber 24 from node 14 to node 11.

Figure 2:
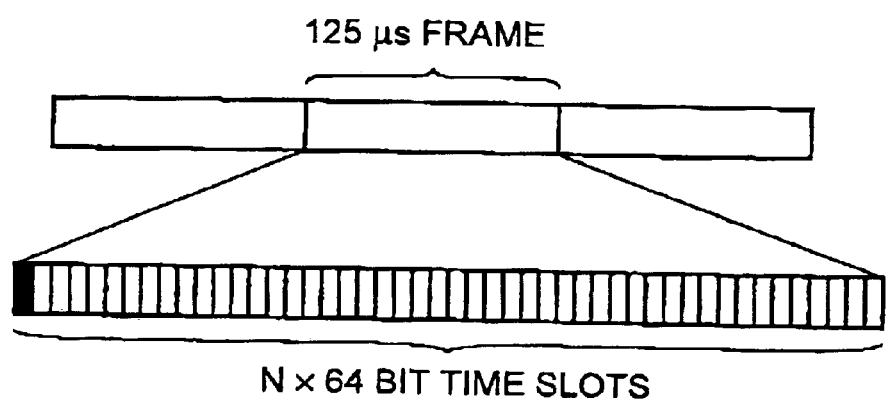
FIGS. 2, 3, and 5 schematically show a time multiplexed bitstream according to the embodiment of the invention.

The structure of the bitstream propagating on the ring link in FIG. 1 is schematically shown in FIG. 2. As illustrated, the bitstream is divided into recurrent, essentially fixed size (125 μs) frames, each of which in turn being divided into a plurality (N) of fixed size (64 bit) time slots. The start of each frame is defined by a frame start signal, illustrated as a black filled slot in the figures.

During normal operation, write access to the time slots (i.e. The time slot positions) of the recurring frames is distributed among the nodes connected to the ring link in such a way that no two nodes shall have write access to the same time slot position, at least not over the same portion of the ring link. Consequently, each node will typically have write access to one or more time slot positions of the recurring frame. Each node is furthermore typically arranged to establish circuit-switched channels over the link by allocating one or more of the time slots that it has write access to the respective channel. Each such channel will typically have only one sender, but ray as such be unicasted, multicasted or broadcasted on the link, i.e. may be established to be received by one node, some of the nodes, or all nodes on the link. When for example establishing a channel over the link, the node setting-up the channel over the link need typically inform the one or more recipients of the channel about, for example, which time slot position that the channel will be defined by on the link, i.e. which time slot positions of the recurring frame that the recipients shall read data from for the subject channel. To transmit such information to the recipient nodes, each node typically uses a so-called control channel, defined by respective one or more time slots within the recurring frame, to communicate with other nodes. Thus, control channels are used for control signaling among the nodes connected to the link and are separate from the so-called data channels that are established, using control signaling, to carry so-called payload traffic, such as data traffic or streaming voice or video traffic.

Figure 3:
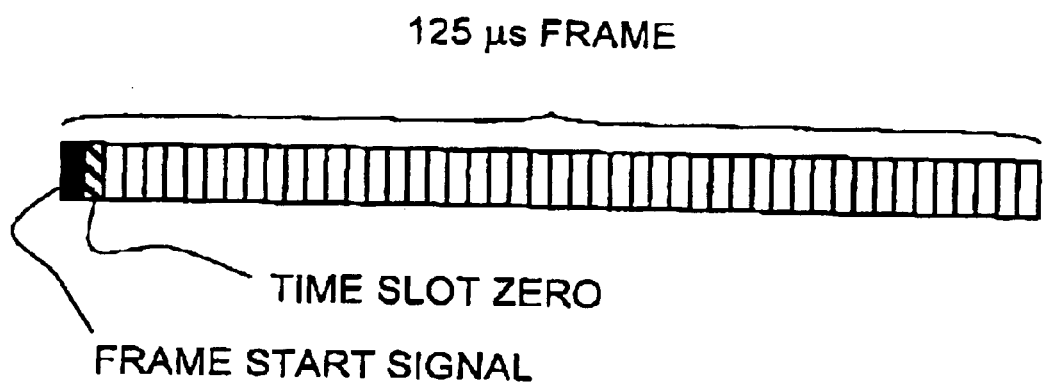

At link start-up, according to the embodiment of the invention, all four nodes connected to the ring link are preconfigured to use the same predefined time slot position within the recurring frame to receive control signaling messages from and to transmit control signaling messages to the other nodes connected to the link. More specifically, in the exemplifying embodiment, the nodes are preconfigured to use the first time slot position within each frame, also referred to as time slot zero (as schematically identified in FIG. 3), for control signaling at link start-up.

Figure 4:
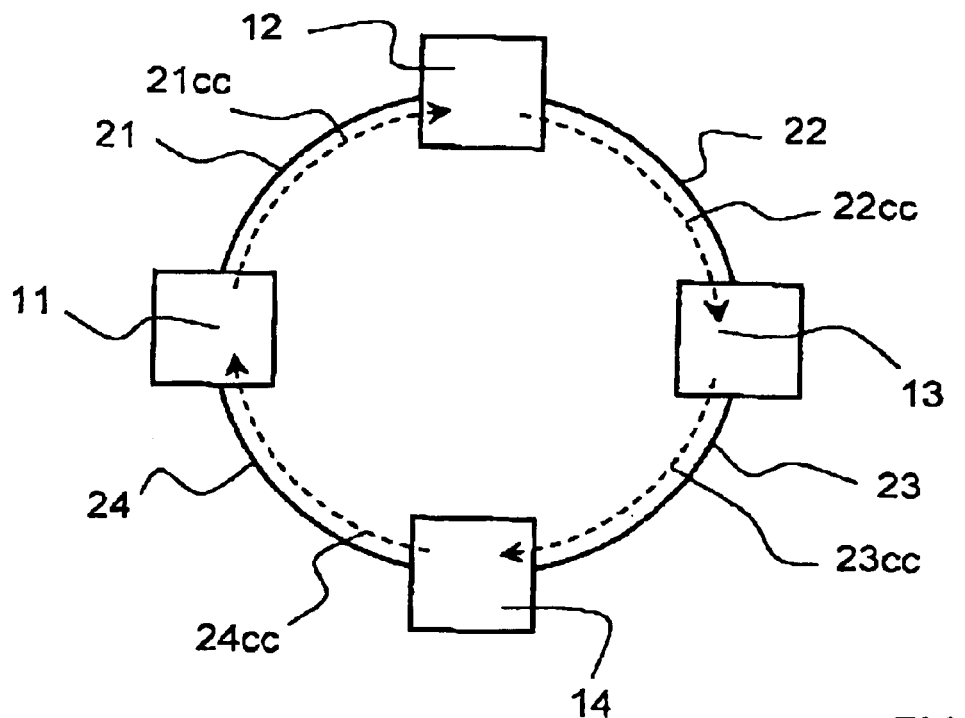

The preconfigured control signaling transmission path offered by time slot zero may thus in this embodiment be regarded as being comprised of four point-to-point channels (illustrated by dashed arrows 21cc, 22cc, 23cc, and 24cc in FIG. 4), all being defined by the same predefined time slot (time slot zero in this embodiment) on the link, each interconnecting neighbor nodes on the link, and all together forming a packet switched control signaling channel (defined by time slot zero) for control signaling on the link. Thus, in FIG. 4, channel 21cc forms a control channel that originates at node 11 and terminates at node 12 and is defined by time slot zero, channel 22cc forms a control channel that originates at node 12 and terminates at node 13 and is defined by, time slot zero, and so on.

Control signaling messages transmitted on time slot zero may in this embodiment be either unicast messages, multicast messages or broadcast messages on the link. Consequently, each node receiving a control message in time slot zero must, typically by examining a destination address for the message, determine whether or not the content of the message is intended for the node and whether or not the message shall be transmitted from the node, also in time slot zero, to reach one or more downstream nodes on the link.

According to the invention, using control signaling via the time slot zero, the nodes will establish separate control channels, each reserved for transmission of control messages from respective ones of the nodes, each dedicated control channel being defined by a respective time slot or set of time slots within the recurring frame.

A so-established separate control signaling channel may for example be a circuit switched point-to-point or point-to-multipoint control signaling channel to be used for transmission of control signaling messages on the link from an exclusive one of the four nodes.

Figure 5:
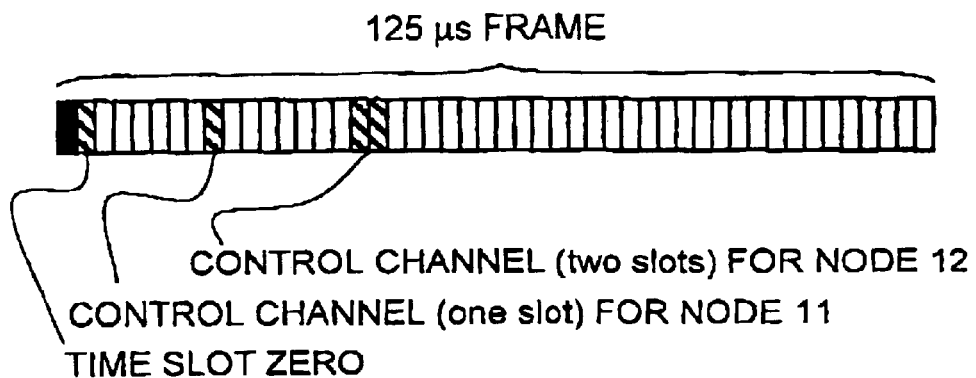
Figure 6:
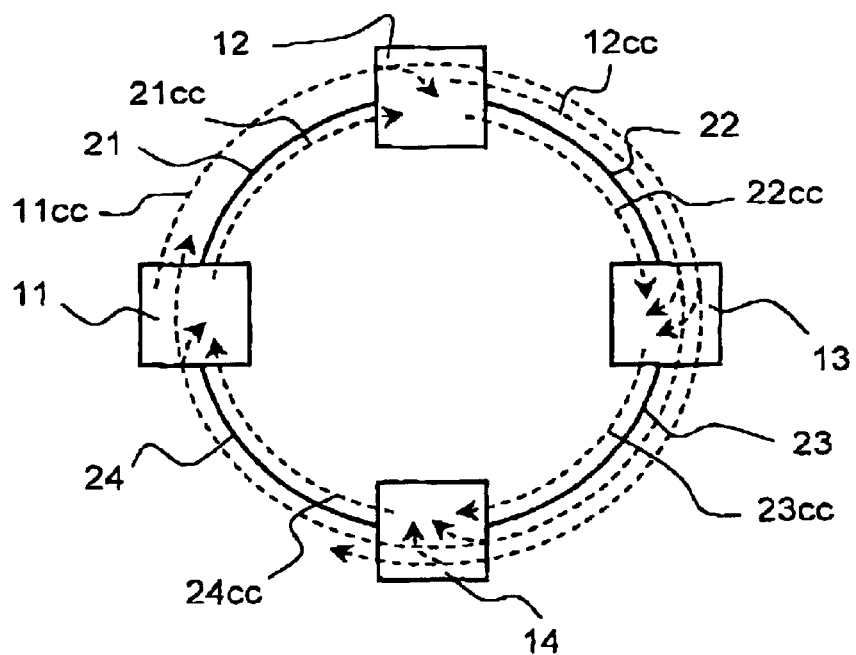

For example, in FIGS. 5 and 6 it is assumed that node 11 has so-established a point-to-multipoint control channel 11cc, in the example defined by time slot seven (7) within the recurring frame, that node 11 has exclusive write access to and that the other nodes 12, 13, and 14 on the link have been set to by-pass while only listen to, i.e. receive control signaling message from, and never transmit data in. Thus, the control channel 11c dedicated for node 11 originates at node 11, and tho information provided therein is "dropped", or copied, at node 12, 13, and 14, but the channel as such is thus not terminated at node 12, 13 or 14. Having done so, the node 11 will start using the control channel 11cc for transmitting control signaling messages to other node on the link, for example when establishing other "payload" channels on the link.

Similarly, in FIGS. 5 and 6 it is assumed that node 12 has likewise established a point-to-multipoint control channel 12cc, in the example defined by time slots fifteen (15) and sixteen (16) within the recurring frame, that node 12 has exclusive write access to and that the other nodes 12, 14, and 11 on the link have been set to by-pass while only listen to.

According to a preferred embodiment of the invention, the nodes will continue to use the "hop-by-hop" control channels 21cc–24cc for control signaling regarding general link status and monitoring features even when the dedicated control channels 11cc–12cc have been established. For example, if it is assumed that the exemplified network uses a distributed link topology discovery protocol which as such is based on exchanging of control messages on a node-to-neighbor-node-basis, then control message exchanged according to such a protocol is transmitted using the control channels 21cc–24cc, whereas any control messages transmitted from, e.g., node 11 pertaining to the node's 11 actual management of channels on the link are transmitted using the node's dedicated control channel 11cc. (The latter of course given that the dedicated channel 11cc has been established and is up-and-running. If not, the control channel 21cc will be used for the latter kind of control messaging also).

To be noted, the policy or protocol by which it is determined which node that shall use which time slots for control signaling could be defined in different ways depending on the desired network behavior.

As one example, the nodes will automatically first determine which nodes that has write access to which slots on the link by a negotiation procedure including exchanging of control messages among each other using time slot zero as shared control channel. Each node will then automatically select a set of one or more time slots from the group of time slots that it has so been determined to have write access to, to be used exclusively by the node as its own control channel, and will then inform, using time slot zero, downstream nodes about the existence of this new, exclusive control channel.

As another example, the operator may manually configure, at each node, which respective time slots on the link that the respective node has write access to. Each node may then on its own automatically select a set of one or more time slots from the group of time slots that it has so been configured to have write access to, to be used exclusively by the node as its own control channel, and will then inform, using time slot zero, downstream nodes about the existence of this new, exclusive control channel.

As yet another example, the time slots assigned for a node to use as its own control channel could be manually configured at each node. Each node will then inform, using time slot zero, downstream nodes about the existence of the respective, exclusive control channel, and may then use the so-established dedicated control channel for signaling from then on.

To be noted, during operation, the nodes will typically use tho shared control channel and/or the respective dedicated control channels for signaling when allocating time slots to establish the actual payload channels over the link. However, the manner in which such control signaling is performed to establish such payload traffic channels will not be described in detail herein.

Even though exemplifying embodiment of the invention has been described in detail above, modifications, combinations and alterations thereof may be made, as will be clear to those skilled in the art, within the scope of the invention, which is defined by the accompanying claims. For example, even though the exemplifying embodiment of invention described above has been made with reference to a single ring link topology, the invention could just as well be realized in most other types of time division multiplexed network topologies, such as point-to-point, dual ring or bus link topologies.

What is claimed is:

1. A method for establishing control signaling between nodes connected to the same communication link, said link carrying a bitstream that is divided into frames, each frame in turn being divided into time slots, said time slots being allocatable to form circuit-switched channels, said method comprising the steps of:

all nodes connected to said link using, at link start-up, the same predefined time slot or set of time slots in each fame of said frames to receive control signaling messages from and transmit control signaling messages to nodes connected to said link;

said nodes establishing, using control signaling via said predefined time slot or set of time slots, respective control channels, defined by respective time slots or sets of time slots in said frames, reserved for transmission of control signaling messages from respective ones of said nodes;

each respective one of said nodes using, when having been reserved such a respective control channel, its respective control channel for sending control signaling messages to other nodes connected to said link, the other nodes on the link accessing this respective control channel only for receiving control signaling messages.

2. A method as claimed in claim 1, said step of said nodes establishing respective control channels to be used for transmission of control signaling messages from respective ones of said nodes comprising said nodes first determining, using control signaling via said predefined time slot or set of time slots, which nodes that shall have reserved write access to which time slots of said frame, each respective node then selecting its respective time slot or set of time slots, to be used as its control channel, from the time slots that it has so been determined to have reserved write access to and informing, using control signaling via said predefined time slot or set of time slots, other nodes of the definition of said respective time slot or set of time slots to be used as the node's control channel for it's transmission of control signaling messages.

3. A method as claimed in claim 1, each node, when receiving a control signaling message in said predefined time slot or set of time slots from an upstream node on a bitstream, determining whether or not the message is addressed exclusively to said node and, if not, transmitting said message to a downstream node on said bitstream in said predefined time slot or set of time slots.

4. A method as claimed in claim 1, wherein, when a respective time slot or set of time slots has been reserved to define a control channel for a respective node, said respective node using said control channel to transmit certain types of control signaling messages and continuing using said predefined time slot or set of time slots to transmit other types of control signaling messages.

5. A method as claimed in claim 4, the first mentioned types of control signaling messages including messages referring to channel management and the second mentioned types of control messages including messages referring to link state monitoring.

6. A method as claimed in claim 1, the number of time slots determined to define the respective control channel is determined independently for each respective node based upon a control signaling capacity criteria for the respective node.

7. A method as claimed in claim 1, wherein a signaling protocol that is used on said predefined time slot or set of time slots to establish said control channels and/or payload channels is the same protocol as the one that is used on said control channels for establishing payload channels.

8. A method as claimed in claim 1, said link being a unidirectional shared link.

9. A method as claimed in claim 1, said frames and said time slots each being of fixed size.

10. A method as claimed in claim 1, said predefined time slot or set of time slots being the first time slot in each frame.

11. A method for establishing control signaling between nodes connected to the same communication link, said link carrying a bitstream that is divided into frames, each frame in turn being divided into time slots, said time slots being allocatable to define circuit-switched channels, said method being performed by a subject node of said nodes and comprising the steps of:

using, at link start-up, a predefined time slot or set of time slots in each frame of said frames to receive control signaling messages from and to transmit control signaling messages to other nodes connected to said link, said predefined time slot or set of time slots being the same for all nodes connected to said link;

establishing, using control signaling via said predefined time slot or set of time slots, a control channel defined by another time slot or set of time slots in said frames to be used exclusively by the subject node for transmission of control signaling messages to other nodes connected to said link; and, having done so, using said control channel to transmit control signaling messages to other nodes connected to said link.

12. A method as claimed in claim 11, said allocating step comprising the steps of:
  determining, using control signaling via said predefined time slot or set of time slots, which time slots of said frame that the subject node shall have reserved write access to;
  selecting said another time slot or set of time slots, to define said control channel, from the time slots that the subject node has so been determined to have reserved write access to; and
  informing, using control signaling via said predefined time slot or set of time slots, other nodes of the definition of said another time slot or set of time slots to be used as the subject node's control channel for its transmission of control signaling messages.

13. A method as claimed in claim 12, further comprising determining, using control signaling via said predefined time slot or set of time slots, yet another time slot or set of time slots in said frames defining a another control channel to be used exclusively by another node for transmission of control signaling messages on said link, the subject node only read accessing said another control channel to receive control signaling messages from said another node.

14. A method as claimed in claim 11, the subject node, when receiving a control signaling message in said predefined time slot or set of time slots from an upstream node on the link, determining whether or not the message is addressed exclusively to the subject node and, if not, transmitting said message to a downstream node on said link in said predefined time slot or set of time slots.

15. A method as claimed in claim 11, the subject node, when having established said control channel, using said control channel to transmit certain types of control signaling messages and continuing using said predefined time slot or set of time slots to transmit other types of control singling messages.

16. A method as claimed in claim 11, wherein the control signaling messages received in and transmitted in said predefined time slot or set of time slots include including messages referring to channel management, and the control signaling messages transmitted in said another time slot or set of time slots include messages referring to link state monitoring.

17. A method as claimed in claim 11, the number of time slots allocated to define said control channel being determined independently for the subject node based upon a signaling capacity criterion for the subject node.

18. A method as claimed in claim 11, wherein a signaling protocol that is used on said predefined time slot or set of time slots to establish said control channels and/or payload channels is the same protocol as the one that is used on said control channels for establishing payload channels.

19. A method as claimed in claim 11, said link being a unidirectional shared link.

20. A method as claimed in claim 11, said frames and said time slots each being of fixed size.

21. A method as claimed in claim 11, said predefined time slot or set of time slots being the first time slot in each frame.

22. A method for establishing control signaling between nodes connected to the same communication link, said link carrying a bitstream that is divided into frames, each frame in turn being divided into time slots, said time slots being allocatable to define circuit switched channels, said method comprising the steps of;
  at link start-up said nodes using predefined point-to-point channels to interconnect neighbor nodes on said link, said predefined point-to-point channels all being defined by the same predefined time slot or set of time slots in each frame of said frames and all together forming a packet switched control signaling channel for control signaling;
  said nodes using control signaling via said packet switched control signaling channel to establish respective circuit switched point-to-multipoint control signaling channels defined by respective time slots or set of time slots on said frames to be used for transmission of control signaling messages from respective exclusive ones of said nodes.

* * * * *